United States Patent
Bonin et al.

(10) Patent No.: US 11,926,115 B2
(45) Date of Patent: Mar. 12, 2024

(54) METHOD FOR PRODUCING A SOLE OF A SHOE, IN PARTICULAR OF A SPORTS SHOE

(71) Applicant: PUMA SE, Herzogenaurach (DE)

(72) Inventors: Mauro Bonin, Nuremberg (DE); Matthias Hartmann, Forchheim (DE); Reinhold Sussmann, Scheinfeld (DE)

(73) Assignee: PUMA SE, Herzogenaurach (DE)

( * ) Notice: Subject to any disclaimer, the term of this patent is extended or adjusted under 35 U.S.C. 154(b) by 694 days.

(21) Appl. No.: 17/053,513

(22) PCT Filed: May 8, 2018

(86) PCT No.: PCT/EP2018/061935
§ 371 (c)(1),
(2) Date: Nov. 6, 2020

(87) PCT Pub. No.: WO2019/214815
PCT Pub. Date: Nov. 14, 2019

(65) Prior Publication Data
US 2021/0237383 A1    Aug. 5, 2021

(51) Int. Cl.
*B29D 35/14* (2010.01)
*B29C 45/14* (2006.01)
(Continued)

(52) U.S. Cl.
CPC ...... *B29D 35/142* (2013.01); *B29C 45/14467* (2013.01); *B29C 70/84* (2013.01);
(Continued)

(58) Field of Classification Search
CPC .. B29D 35/142; B29D 35/128; B29D 35/122; B29D 35/0018; B29C 70/84; B29C 65/70; B29C 45/14467
See application file for complete search history.

(56) References Cited

U.S. PATENT DOCUMENTS

| | | | |
|---|---|---|---|
| 2,983,056 A | 5/1961 | Murawski | |
| 3,469,576 A | 9/1969 | Smith | |

(Continued)

FOREIGN PATENT DOCUMENTS

| | | |
|---|---|---|
| CN | 1285779 A | 2/2001 |
| CN | 1334054 A | 2/2002 |

(Continued)

OTHER PUBLICATIONS

Machine translation of Van Elten (DE 102015118251 A1) dated Apr. 2017. (Year: 2017).*

(Continued)

*Primary Examiner* — Robert B Davis
(74) *Attorney, Agent, or Firm* — Quarles & Brady LLP

(57) ABSTRACT

The invention relates to a method for producing a sole (1) of a shoe. According to the invention, to produce a sole with cavities in a process-stable manner, the method comprises the following steps: a) producing a first sole part (2) in a first mould or mould part (3) by injecting the sole material into a mould cavity (4) of the first mould (3), wherein a number of volume elements (5) protrude into the mould cavity (4) and create cavities (6) in the first sole part (2); b) producing a second sole part (7) in a second mould (8) by injecting the sole material into a mould cavity (9) of the second mould (8), wherein a number of volume elements (10) protrude into the mould cavity (9) and create cavities (6) in the second sole part (7); c) after the first and second sole parts (2, 7) have solidified: removing the first and second sole parts (2, 7) from the first and second mould (3, 8) and placing the first and second sole parts (2, 7) into a third mould (11); d) pouring a joining material (14) over at least one section (12, 13) of the first and second sole parts (2, 7), the sections (12, 13) of the first and second sole part (2, 7) over which the (Continued)

Figure 1:
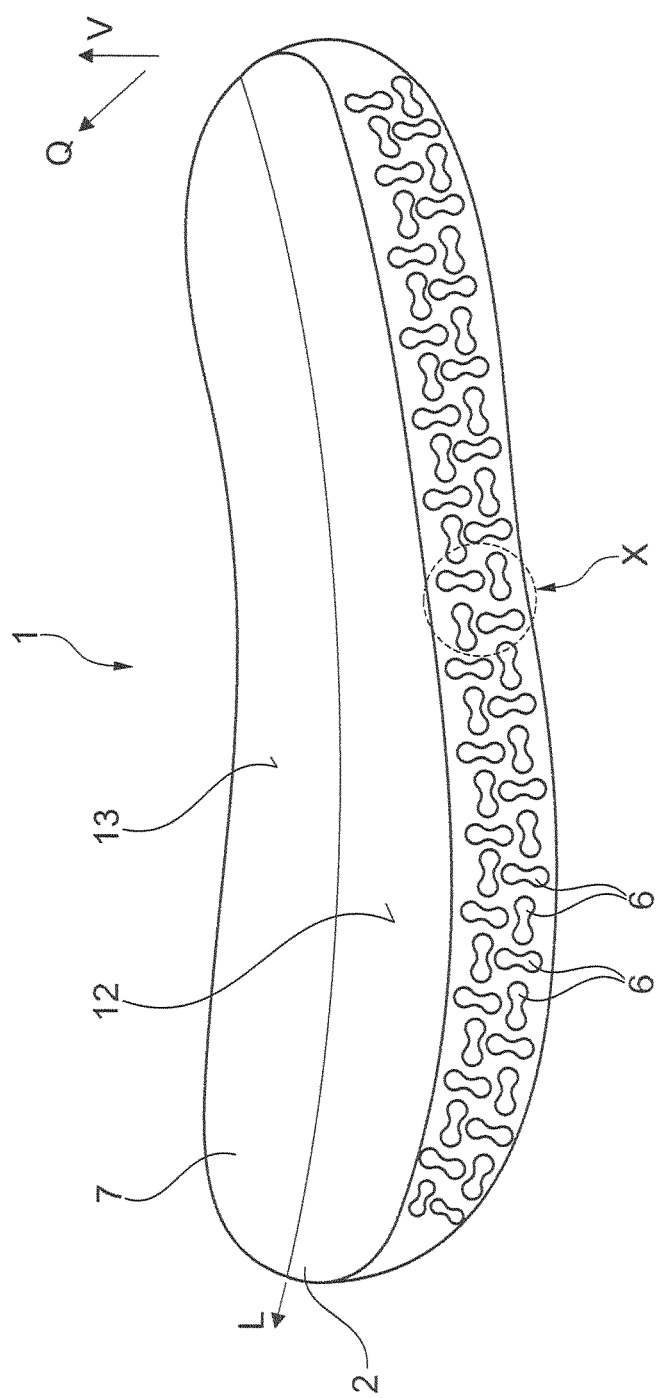

material is poured adjoining each other, in order to join the first and second sole parts (2, 7) to each other.

19 Claims, 8 Drawing Sheets

(51) Int. Cl.
   *B29C 70/84* (2006.01)
   *B29D 35/00* (2010.01)
   *B29D 35/12* (2010.01)
(52) U.S. Cl.
   CPC ....... *B29D 35/0018* (2013.01); *B29D 35/122* (2013.01); *B29D 35/128* (2013.01)

(56) References Cited

U.S. PATENT DOCUMENTS

| | | |
|---|---|---|
| 3,573,155 A | 3/1971 | Mitchell |
| 3,629,051 A | 12/1971 | Mitchell |
| 4,100,686 A | 7/1978 | Sgarlato et al. |
| 4,112,599 A | 9/1978 | Krippelz |
| D256,067 S | 7/1980 | Hagg et al. |
| 4,235,026 A | 11/1980 | Plagenhoef |
| D265,017 S | 6/1982 | Vermonet |
| D272,963 S | 3/1984 | Muller et al. |
| 4,779,359 A | 10/1988 | Famolare, Jr. |
| D298,582 S | 11/1988 | Caire |
| D304,520 S | 11/1989 | Clark |
| D307,971 S | 5/1990 | Maccano et al. |
| 4,942,679 A | 7/1990 | Brandon et al. |
| 4,944,099 A | 7/1990 | Davis |
| D311,989 S | 11/1990 | Parker et al. |
| 5,042,176 A | 8/1991 | Rudy |
| 5,084,987 A | 2/1992 | Flemming |
| D324,762 S | 3/1992 | Hatfield |
| 5,134,790 A | 8/1992 | Woitschaetzke et al. |
| D329,528 S | 9/1992 | Hatfield |
| 5,152,081 A | 10/1992 | Hallenbeck et al. |
| D330,629 S | 11/1992 | Bramani |
| 5,197,206 A | 3/1993 | Shorten |
| 5,197,207 A | 3/1993 | Shorten |
| D337,650 S | 7/1993 | Thomas, III et al. |
| D340,797 S | 11/1993 | Pallera et al. |
| 5,313,717 A | 5/1994 | Allen et al. |
| 5,329,705 A | 7/1994 | Grim et al. |
| D350,222 S | 9/1994 | Hase |
| 5,378,223 A | 1/1995 | Grim et al. |
| 5,383,290 A | 1/1995 | Grim |
| D356,438 S | 3/1995 | Opie et al. |
| D365,920 S | 1/1996 | Schneider |
| 5,607,749 A | 3/1997 | Strumor |
| D386,589 S | 11/1997 | Cass |
| D389,991 S | 2/1998 | Elliott |
| D390,349 S | 2/1998 | Murai et al. |
| 5,952,065 A | 9/1999 | Mitchell et al. |
| D414,920 S | 10/1999 | Cahill |
| D415,610 S | 10/1999 | Cahill |
| D415,876 S | 11/1999 | Cahill |
| 5,979,078 A | 11/1999 | McLaughlin |
| D423,199 S | 4/2000 | Cahill |
| D429,874 S | 8/2000 | Gumbert |
| D431,346 S | 10/2000 | Birkenstock |
| D444,620 S | 7/2001 | Della Valle |
| D446,002 S | 8/2001 | Leong et al. |
| D460,852 S | 7/2002 | Daudier |
| 6,467,197 B1 | 10/2002 | Mitsui et al. |
| 6,558,784 B1 | 5/2003 | Norton et al. |
| 6,618,959 B1 | 9/2003 | Sussmann |
| 6,647,646 B2 | 11/2003 | Mitsui et al. |
| D483,932 S | 12/2003 | Cooper |
| 6,670,029 B2 | 12/2003 | Norton et al. |
| 6,763,611 B1 | 7/2004 | Fusco |
| 6,763,615 B2 | 7/2004 | Mitsui et al. |
| D494,343 S | 8/2004 | Morris |
| 6,782,640 B2 | 8/2004 | Westin |
| D496,149 S | 9/2004 | Belley et al. |
| 6,817,113 B2 | 11/2004 | Pan |
| 6,843,000 B1 | 1/2005 | Park |
| 6,848,200 B1 | 2/2005 | Westin |
| 6,883,252 B2 | 4/2005 | Cagner |
| 6,920,707 B1 | 7/2005 | Greene et al. |
| 6,951,066 B2 | 10/2005 | Snow |
| 6,957,504 B2 | 10/2005 | Morris |
| D512,208 S | 12/2005 | Kubo et al. |
| D515,297 S | 2/2006 | Acheson |
| 7,086,179 B2 | 8/2006 | Dojan et al. |
| 7,086,180 B2 | 8/2006 | Dojan et al. |
| 7,096,605 B1 | 8/2006 | Kozo et al. |
| 7,100,310 B2 | 9/2006 | Foxen et al. |
| 7,141,131 B2 | 11/2006 | Foxen et al. |
| 7,153,560 B2 | 12/2006 | Hofmann |
| 7,254,906 B2 | 8/2007 | Morris et al. |
| D549,934 S | 9/2007 | Horne et al. |
| D551,831 S | 10/2007 | Romero-Sanchez |
| D556,982 S | 12/2007 | Harper et al. |
| D560,883 S | 2/2008 | McClaskie |
| D561,433 S | 2/2008 | McClaskie |
| D571,085 S | 6/2008 | McClaskie |
| 7,401,420 B2 | 7/2008 | Dojan et al. |
| D576,780 S | 9/2008 | Jolicoeur |
| D586,090 S | 2/2009 | Turner et al. |
| 7,484,318 B2 | 2/2009 | Finkelstein |
| D596,384 S | 7/2009 | Andersen et al. |
| 7,555,848 B2 | 7/2009 | Aveni et al. |
| 7,556,846 B2 | 7/2009 | Dojan et al. |
| 7,559,107 B2 | 7/2009 | Dojan et al. |
| 7,562,469 B2 | 7/2009 | Dojan |
| D597,293 S | 8/2009 | Banik et al. |
| D601,333 S | 10/2009 | McClaskie |
| 7,665,230 B2 | 2/2010 | Dojan et al. |
| 7,676,955 B2 | 3/2010 | Dojan et al. |
| 7,676,956 B2 | 3/2010 | Dojan et al. |
| 7,685,741 B2 | 3/2010 | Friedman |
| D616,183 S | 5/2010 | Skaja |
| D617,540 S | 6/2010 | McClaskie |
| D624,291 S | 9/2010 | Henderson |
| 7,805,859 B2 | 10/2010 | Finkelstein |
| D631,237 S | 1/2011 | Genuin et al. |
| D631,646 S | 2/2011 | Muller |
| D633,286 S | 3/2011 | Skaja |
| D633,287 S | 3/2011 | Skaja |
| D636,571 S | 4/2011 | Avar |
| 8,074,377 B2 | 12/2011 | Nishiwaki et al. |
| 8,112,909 B2 | 2/2012 | Kubo et al. |
| 8,122,614 B2 | 2/2012 | Sussmann |
| 8,176,657 B2 | 5/2012 | Schinlder et al. |
| 8,296,969 B2 | 10/2012 | Granger et al. |
| D671,305 S | 11/2012 | Escobar |
| D671,306 S | 11/2012 | Tzenos |
| 8,312,644 B2 | 11/2012 | Peikert et al. |
| 8,321,984 B2 | 12/2012 | Dojan et al. |
| 8,356,429 B2 | 1/2013 | Eder et al. |
| 8,418,379 B2 | 4/2013 | Nishiwaki et al. |
| 8,429,835 B2 | 4/2013 | Dojan et al. |
| D693,553 S | 11/2013 | McClaskie |
| 8,572,866 B2 | 11/2013 | Dojan et al. |
| 8,578,535 B2 | 11/2013 | Dojan et al. |
| D696,501 S | 12/2013 | Miner |
| D696,502 S | 12/2013 | Miner |
| D696,503 S | 12/2013 | Miner |
| 8,657,979 B2 | 2/2014 | Dojan et al. |
| 8,671,591 B2 | 3/2014 | Brown |
| 8,745,892 B2 | 6/2014 | Polegato Moretti |
| D709,680 S | 7/2014 | Herath |
| 8,789,298 B2 | 7/2014 | Eder et al. |
| D711,081 S | 8/2014 | Miner |
| D713,623 S | 9/2014 | Lo |
| 8,961,844 B2 | 2/2015 | Baghdadi et al. |
| D731,763 S | 6/2015 | Solstad |
| D734,600 S | 7/2015 | Gargiulo |
| 9,078,493 B2 | 7/2015 | Bradford |
| D739,131 S | 9/2015 | Del Biondi |
| 9,125,454 B2 | 9/2015 | De Roode et al. |

(56) References Cited

U.S. PATENT DOCUMENTS

| | | |
|---|---|---|
| D740,003 S | 10/2015 | Herath |
| D740,004 S | 10/2015 | Hoellmueller et al. |
| D746,559 S | 1/2016 | Besanceney et al. |
| 9,241,536 B2 | 1/2016 | Smaldone et al. |
| D753,381 S | 4/2016 | Ostapenko |
| D756,085 S | 5/2016 | Spring |
| D756,620 S | 5/2016 | Boys |
| 9,351,534 B2 | 5/2016 | Peikert et al. |
| D758,056 S | 6/2016 | Galway et al. |
| D759,358 S | 6/2016 | Cullen |
| 9,402,439 B2 | 8/2016 | Cross et al. |
| D765,361 S | 9/2016 | Johnsongriffin |
| D765,362 S | 9/2016 | Kuerbis |
| D767,263 S | 9/2016 | Reiser |
| 9,456,656 B2 | 10/2016 | Cross |
| 9,486,036 B1 | 11/2016 | Douglas |
| D773,161 S | 12/2016 | Teteriatnikov |
| D773,790 S | 12/2016 | Raysse |
| D773,791 S | 12/2016 | Raysse |
| 9,510,640 B2 | 12/2016 | Bier et al. |
| D776,410 S | 1/2017 | Galway et al. |
| 9,538,811 B2 | 1/2017 | Cross |
| 9,549,590 B2 | 1/2017 | Cross et al. |
| 9,554,620 B2 | 1/2017 | Cross et al. |
| 9,554,622 B2 | 1/2017 | Cross |
| 9,554,624 B2 | 1/2017 | Cross |
| 9,572,404 B2 | 2/2017 | Dojan et al. |
| D781,543 S | 3/2017 | Raysse |
| 9,585,435 B2 | 3/2017 | Bier et al. |
| D783,247 S | 4/2017 | McMillan |
| 9,610,746 B2 | 4/2017 | Wardlaw et al. |
| 9,682,522 B2 | 6/2017 | Baghdadi et al. |
| 9,687,041 B2 | 6/2017 | Peikert et al. |
| D790,817 S | 7/2017 | Perkins et al. |
| D791,452 S | 7/2017 | Dombrow |
| D792,067 S | 7/2017 | Raysse |
| D793,680 S | 8/2017 | Lee |
| D793,688 S | 8/2017 | Avar et al. |
| D794,289 S | 8/2017 | Kanata |
| 9,717,301 B2 | 8/2017 | Peikert et al. |
| 9,723,895 B2 | 8/2017 | Schaefer et al. |
| D797,418 S | 9/2017 | Lee et al. |
| D798,553 S | 10/2017 | Lee |
| D799,183 S | 10/2017 | Weeks |
| 9,775,769 B2 | 10/2017 | Brown et al. |
| 9,781,970 B2 | 10/2017 | Wardlaw et al. |
| 9,781,974 B2 | 10/2017 | Reinhardt et al. |
| 9,788,598 B2 | 10/2017 | Reinhardt et al. |
| 9,788,606 B2 | 10/2017 | Reinhardt et al. |
| 9,795,186 B2 | 10/2017 | Reinhardt et al. |
| 9,820,528 B2 | 11/2017 | Reinhardt et al. |
| 9,820,532 B2 | 11/2017 | Cross et al. |
| 9,849,645 B2 | 12/2017 | Wardlaw et al. |
| D808,143 S | 1/2018 | Negri |
| 9,854,869 B2 | 1/2018 | Nordstrom |
| 9,861,159 B2 | 1/2018 | Kohatsu et al. |
| D809,755 S | 2/2018 | Stavseng et al. |
| D809,756 S | 2/2018 | Stavseng et al. |
| D809,761 S | 2/2018 | Parrett |
| D810,407 S | 2/2018 | DeAlmeida |
| D811,062 S | 2/2018 | Teague |
| 9,884,947 B2 | 2/2018 | Prissok et al. |
| D813,508 S | 3/2018 | Weeks |
| 9,926,423 B2 | 3/2018 | Baghdadi |
| D814,752 S | 4/2018 | Ormsby |
| 9,930,928 B2 | 4/2018 | Whiteman et al. |
| 9,961,961 B2 | 5/2018 | Smith |
| 9,968,157 B2 | 5/2018 | Wardlaw et al. |
| 9,968,160 B2 | 5/2018 | Peyton |
| 10,039,342 B2 | 8/2018 | Reinhardt et al. |
| 10,051,914 B2 | 8/2018 | Cross et al. |
| 10,051,917 B2 | 8/2018 | Dojan et al. |
| D828,686 S | 9/2018 | Hoellmueller et al. |
| D831,315 S | 10/2018 | Mahoney |
| D831,317 S | 10/2018 | Jenkins et al. |
| 10,098,411 B2 | 10/2018 | Hoffer et al. |
| 10,098,412 B2 | 10/2018 | Hoffer et al. |
| 10,111,494 B2 | 10/2018 | Cross |
| D836,893 S | 1/2019 | Bischoff et al. |
| 10,182,612 B2 | 1/2019 | Bunnell et al. |
| D840,135 S | 2/2019 | Dombrow |
| D840,136 S | 2/2019 | Herath et al. |
| D840,137 S | 2/2019 | Herath et al. |
| 10,226,099 B2 | 3/2019 | Bischoff |
| 10,227,467 B2 | 3/2019 | Baghdadi |
| D846,255 S | 4/2019 | Khalife |
| D846,256 S | 4/2019 | Khalife |
| 10,259,183 B2 | 4/2019 | Wardlaw et al. |
| 10,271,615 B2 | 4/2019 | Cross |
| D847,475 S | 5/2019 | Khalife |
| D847,480 S | 5/2019 | Khalife |
| 10,278,448 B2 | 5/2019 | Cross |
| 10,285,471 B2 | 5/2019 | Cross |
| D850,766 S | 6/2019 | Girard et al. |
| D851,889 S | 6/2019 | Dobson et al. |
| D852,475 S | 7/2019 | Hoellmueller |
| D852,476 S | 7/2019 | Hartmann |
| D853,691 S | 7/2019 | Coonrod et al. |
| D853,699 S | 7/2019 | Coonrod et al. |
| 10,433,616 B2 | 10/2019 | Takeshita et al. |
| 10,470,521 B2 | 11/2019 | Iuchi et al. |
| 10,645,998 B2 | 5/2020 | Shaffer et al. |
| 10,786,039 B2 | 9/2020 | Kohatsu et al. |
| 11,076,656 B2 | 8/2021 | Kormann et al. |
| 2002/0071946 A1 | 6/2002 | Norton et al. |
| 2003/0097767 A1 | 5/2003 | Perkinson |
| 2003/0208925 A1 | 11/2003 | Pan |
| 2004/0148805 A1 | 8/2004 | Morris |
| 2004/0154189 A1 | 8/2004 | Wang |
| 2006/0026863 A1 | 2/2006 | Liu |
| 2006/0234012 A1 | 10/2006 | Wang |
| 2008/0127513 A1 | 6/2008 | Schinlder et al. |
| 2008/0148599 A1 | 6/2008 | Collins |
| 2009/0064542 A1 | 3/2009 | Figueroa |
| 2009/0172971 A1 | 7/2009 | Peikert et al. |
| 2010/0242309 A1 | 9/2010 | McCann |
| 2011/0047720 A1 | 3/2011 | Maranan et al. |
| 2011/0197468 A1 | 8/2011 | Kubo et al. |
| 2011/0252670 A1 | 10/2011 | Smith |
| 2013/0055599 A1 | 3/2013 | Peikert et al. |
| 2013/0059116 A1 | 3/2013 | Peikert et al. |
| 2013/0145653 A1 | 6/2013 | Bradford |
| 2013/0160223 A1 | 6/2013 | Bier et al. |
| 2013/0233477 A1 | 9/2013 | Bier et al. |
| 2013/0291409 A1 | 11/2013 | Reinhardt et al. |
| 2013/0312284 A1 | 11/2013 | Berend et al. |
| 2014/0033574 A1 | 2/2014 | Wan |
| 2014/0086504 A1 | 3/2014 | Arai |
| 2014/0151918 A1 | 6/2014 | Hartmann |
| 2014/0196308 A1 | 7/2014 | Baratta et al. |
| 2014/0208610 A1 | 7/2014 | Dirsa et al. |
| 2014/0223776 A1 | 8/2014 | Wardlaw et al. |
| 2014/0223777 A1 | 8/2014 | Whiteman et al. |
| 2014/0259745 A1* | 9/2014 | Vaglio .................. A43B 13/12 156/60 |
| 2015/0096203 A1 | 4/2015 | Brown et al. |
| 2015/0272272 A1 | 10/2015 | Scofield |
| 2016/0007676 A1 | 1/2016 | Leimer et al. |
| 2016/0025343 A1 | 1/2016 | Bertoldi |
| 2016/0037859 A1 | 2/2016 | Smith et al. |
| 2016/0044992 A1 | 2/2016 | Reinhardt et al. |
| 2016/0120260 A1 | 5/2016 | Hansen et al. |
| 2016/0227876 A1 | 8/2016 | Le et al. |
| 2016/0242502 A1 | 8/2016 | Spanks |
| 2016/0278481 A1 | 9/2016 | Le et al. |
| 2016/0295955 A1 | 10/2016 | Wardlaw et al. |
| 2016/0324260 A1 | 11/2016 | Guyan |
| 2016/0345665 A1 | 12/2016 | Kohatsu et al. |
| 2016/0374428 A1 | 12/2016 | Kormann et al. |
| 2017/0006958 A1 | 1/2017 | Jeong |
| 2017/0105478 A1 | 4/2017 | Cross et al. |
| 2017/0172251 A1 | 6/2017 | Douglas |
| 2017/0245581 A1 | 8/2017 | McFarland, et al. |
| 2017/0245582 A1 | 8/2017 | Green et al. |

(56) References Cited

U.S. PATENT DOCUMENTS

| | | |
|---|---|---|
| 2017/0253710 A1 | 9/2017 | Smith et al. |
| 2017/0258178 A1 | 9/2017 | Cross et al. |
| 2017/0258180 A1 | 9/2017 | Cross et al. |
| 2017/0259474 A1 | 9/2017 | Holmes et al. |
| 2017/0341325 A1 | 11/2017 | Le et al. |
| 2017/0354568 A1 | 12/2017 | Brown et al. |
| 2018/0000197 A1 | 1/2018 | Wardlaw et al. |
| 2018/0027922 A1 | 2/2018 | Orand |
| 2018/0035755 A1 | 2/2018 | Reinhardt et al. |
| 2018/0049509 A1 | 2/2018 | Zwick et al. |
| 2018/0064210 A1 | 3/2018 | Turner et al. |
| 2018/0077997 A1 | 3/2018 | Hoffer et al. |
| 2018/0077998 A1 | 3/2018 | Nordstrom |
| 2018/0092432 A1 | 4/2018 | Hoffer et al. |
| 2018/0098602 A1 | 4/2018 | Kohatsu et al. |
| 2018/0100049 A1 | 4/2018 | Prissok et al. |
| 2018/0103719 A1 | 4/2018 | Chen |
| 2018/0103725 A1 | 4/2018 | Chen |
| 2018/0110292 A1 | 4/2018 | Beers et al. |
| 2018/0116327 A9 | 5/2018 | McFarland et al. |
| 2018/0125156 A1 | 5/2018 | Bray, Jr. |
| 2018/0125157 A1 | 5/2018 | Bray, Jr. |
| 2018/0132487 A1 | 5/2018 | Kormann et al. |
| 2018/0153264 A1 | 6/2018 | Amos et al. |
| 2018/0154598 A1 | 6/2018 | Kurtz et al. |
| 2018/0199667 A1 | 7/2018 | Wang |
| 2018/0206591 A1 | 7/2018 | Whiteman et al. |
| 2018/0206599 A1 | 7/2018 | Amos et al. |
| 2018/0235310 A1 | 8/2018 | Wardlaw et al. |
| 2018/0289108 A1 | 10/2018 | Hoffer et al. |
| 2018/0289109 A1 | 10/2018 | Beers et al. |
| 2018/0303198 A1 | 10/2018 | Reinhardt et al. |
| 2018/0325217 A1 | 11/2018 | Dojan et al. |
| 2018/0338569 A1 | 11/2018 | Cross et al. |
| 2018/0352900 A1 | 12/2018 | Hartmann et al. |
| 2019/0082782 A1 | 3/2019 | Bunnell et al. |
| 2019/0126580 A1 | 5/2019 | Paulson et al. |
| 2019/0133251 A1 | 5/2019 | Hartmann et al. |
| 2019/0150564 A1 | 5/2019 | Bischoff |
| 2019/0216167 A1 | 7/2019 | Hoffer et al. |
| 2019/0216168 A1 | 7/2019 | Hoffer et al. |
| 2019/0223539 A1 | 7/2019 | Hoffer et al. |
| 2019/0223550 A1 | 7/2019 | Levy |
| 2019/0223551 A1 | 7/2019 | Hoffer et al. |
| 2019/0281921 A1 | 9/2019 | Bray, Jr. |
| 2019/0291371 A1 | 9/2019 | Wardlaw et al. |

FOREIGN PATENT DOCUMENTS

| | | | |
|---|---|---|---|
| CN | 1653982 A | 8/2005 | |
| CN | 2790218 Y | 6/2006 | |
| CN | 101299941 A | 11/2008 | |
| CN | 201226862 Y | 4/2009 | |
| CN | 101537675 A | 9/2009 | |
| CN | 201813947 U | 5/2011 | |
| CN | 102273769 A | 12/2011 | |
| CN | 102481746 A | 5/2012 | |
| CN | 104256997 A | 1/2015 | |
| CN | 105025745 A | 11/2015 | |
| CN | 105476176 A | 4/2016 | |
| CN | 106939097 A | 7/2017 | |
| CN | 107048591 A | 8/2017 | |
| CN | 206808782 U | 12/2017 | |
| DE | 3440206 A1 | 5/1985 | |
| DE | 202005017043 U1 | 3/2007 | |
| DE | 102015118251 A1 * | 4/2017 | ........... B29D 35/142 |
| DM | 102274 | 8/2018 | |
| DM | 103418 | 9/2018 | |
| EM | 001286116-0005 | 7/2011 | |
| EM | 002219956-0024 | 5/2013 | |
| EM | 002772764-0015 | 2/2016 | |
| EM | 003165984-0005 | 6/2016 | |
| EM | 003039619-0034 | 7/2016 | |
| EM | 003315555-0001 | 8/2016 | |
| EM | 003316389-0001 | 8/2016 | |
| EM | 003330174-0003 | 8/2016 | |
| EM | 003344076-0002 | 9/2016 | |
| EM | 003362672-0001 | 9/2016 | |
| EM | 003718311-0019 | 2/2017 | |
| EM | 003761089-0028 | 5/2017 | |
| EM | 004363935-0008 | 10/2017 | |
| EM | 004386571-0002 | 10/2017 | |
| EM | 004366326-0001 | 11/2017 | |
| EM | 003761113-0025 | 12/2017 | |
| EM | 004675411-0006 | 1/2018 | |
| EM | 004543882-0008 | 5/2018 | |
| EM | 005243227-0002 | 5/2018 | |
| EM | 005260023-0003 | 5/2018 | |
| EM | 005278413-0002 | 5/2018 | |
| EM | 005320371-0002 | 7/2018 | |
| EM | 005841939-0004 | 12/2018 | |
| EM | 003649060-0005 | 1/2019 | |
| EM | 004352755-0004 | 1/2019 | |
| EM | 005612025-0001 | 1/2019 | |
| EM | 004812501-0004 | 2/2019 | |
| EM | 005191004-0010 | 2/2019 | |
| EM | 006335345-0003 | 4/2019 | |
| EM | 003522580-0029 | 6/2019 | |
| EM | 003649540-0001 | 7/2019 | |
| EP | 1021965 A2 | 7/2000 | |
| EP | 1164884 A1 | 1/2002 | |
| EP | 1033924 B1 | 9/2003 | |
| EP | 1563750 A1 | 8/2005 | |
| EP | 1991078 A1 | 11/2008 | |
| EP | 2103420 A2 | 9/2009 | |
| EP | 1979401 B1 | 9/2010 | |
| EP | 2490561 A1 | 8/2012 | |
| EP | 1991728 B1 | 1/2013 | |
| EP | 2611323 A1 | 7/2013 | |
| EP | 2490564 B1 | 1/2014 | |
| EP | 2786670 A1 | 10/2014 | |
| EP | 2724635 B1 | 3/2015 | |
| EP | 1796493 B1 | 4/2015 | |
| EP | 2676562 B1 | 4/2015 | |
| EP | 2611321 B1 | 8/2015 | |
| EP | 2984956 A1 | 2/2016 | |
| EP | 3001922 A1 | 4/2016 | |
| EP | 3001923 A1 | 4/2016 | |
| EP | 3027377 A1 | 6/2016 | |
| EP | 3041892 A1 | 7/2016 | |
| EP | 2197311 B1 | 8/2016 | |
| EP | 2649896 B1 | 10/2016 | |
| EP | 3078287 A1 | 10/2016 | |
| EP | 3114954 A1 | 1/2017 | |
| EP | 3114955 A1 | 1/2017 | |
| EP | 3114956 A1 | 1/2017 | |
| EP | 3114959 A1 | 1/2017 | |
| EP | 2713794 B1 | 4/2017 | |
| EP | 3186306 A1 | 7/2017 | |
| EP | 3200640 A1 | 8/2017 | |
| EP | 2467037 B1 | 10/2017 | |
| EP | 2872309 B1 | 11/2017 | |
| EP | 3267818 A1 | 1/2018 | |
| EP | 3267820 A1 | 1/2018 | |
| EP | 3267822 A1 | 1/2018 | |
| EP | 3267823 A1 | 1/2018 | |
| EP | 3267824 A2 | 1/2018 | |
| EP | 3267826 A1 | 1/2018 | |
| EP | 2910141 B1 | 2/2018 | |
| EP | 3289907 A1 | 3/2018 | |
| EP | 3302143 A1 | 4/2018 | |
| EP | 3308663 A1 | 4/2018 | |
| EP | 3318150 A1 | 5/2018 | |
| EP | 3338581 A1 | 6/2018 | |
| EP | 3346862 A1 | 7/2018 | |
| EP | 2845504 B1 | 8/2018 | |
| EP | 3352607 A1 | 8/2018 | |
| EP | 3352608 A1 | 8/2018 | |
| EP | 3352610 A1 | 8/2018 | |
| EP | 3352611 A1 | 8/2018 | |
| EP | 3352612 A1 | 8/2018 | |
| EP | 3352615 A1 | 8/2018 | |
| EP | 3338984 A3 | 9/2018 | |
| EP | 2948012 B1 | 10/2018 | |

(56) References Cited

FOREIGN PATENT DOCUMENTS

| | | |
|---|---|---|
| EP | 3381311 A1 | 10/2018 |
| EP | 3391767 A1 | 10/2018 |
| EP | 3412164 A1 | 12/2018 |
| EP | 3416516 A1 | 12/2018 |
| EP | 2611322 B1 | 1/2019 |
| EP | 3423621 A1 | 1/2019 |
| EP | 3434128 A1 | 1/2019 |
| EP | 3010362 B1 | 4/2019 |
| EP | 3466291 A1 | 4/2019 |
| EP | 3248770 B1 | 5/2019 |
| EP | 3348160 B1 | 5/2019 |
| EP | 3476237 A1 | 5/2019 |
| EP | 3484320 A1 | 5/2019 |
| EP | 3284362 B1 | 7/2019 |
| EP | 3386334 B1 | 7/2019 |
| EP | 3534743 A1 | 9/2019 |
| GB | 350493 A | 6/1931 |
| IN | 105595519 A | 5/2016 |
| JP | 2002526126 A | 8/2002 |
| JP | 2010158511 A | 7/2010 |
| JP | 5465814 B1 | 4/2014 |
| JP | 2016202903 A | 12/2016 |
| KR | 1101567716 B1 | 11/2015 |
| WO | 2006112622 A1 | 10/2006 |
| WO | 2010021517 A2 | 2/2010 |
| WO | 20100084367 A1 | 7/2010 |
| WO | 2015017088 A1 | 2/2015 |
| WO | 2000051458 A1 | 11/2015 |
| WO | 2016030026 A1 | 3/2016 |
| WO | 2016030333 A1 | 3/2016 |
| WO | 2016053443 A1 | 4/2016 |
| WO | 2016144406 A1 | 9/2016 |
| WO | 2016144407 A1 | 9/2016 |
| WO | 2016144408 A1 | 9/2016 |
| WO | 2016144409 A1 | 9/2016 |
| WO | 2016144410 A1 | 9/2016 |
| WO | 2016144413 A1 | 9/2016 |
| WO | 2016191109 A1 | 12/2016 |
| WO | 2017042127 A1 | 3/2017 |
| WO | 2017053650 A1 | 3/2017 |
| WO | 2017053654 A1 | 3/2017 |
| WO | 2017053658 A1 | 3/2017 |
| WO | 2017053665 A1 | 3/2017 |
| WO | 2017053669 A1 | 3/2017 |
| WO | 2017053674 A1 | 3/2017 |
| WO | 2017097315 A1 | 6/2017 |
| WO | 2017142857 A1 | 8/2017 |
| WO | 2017151496 A1 | 9/2017 |
| WO | 2018011030 A1 | 1/2018 |
| WO | 2018083676 A1 | 5/2018 |
| WO | 2018099833 A1 | 6/2018 |
| WO | 2018103811 A1 | 6/2018 |
| WO | 2018169535 A1 | 9/2018 |
| WO | 2018169537 A1 | 9/2018 |
| WO | 2018192262 A1 | 10/2018 |
| WO | 2019029781 A1 | 2/2019 |
| WO | 2019073607 A1 | 4/2019 |
| WO | 2019101339 A1 | 5/2019 |
| WO | 2019150492 A1 | 8/2019 |

OTHER PUBLICATIONS

International Search Report of International Application No. PCT/EP2018/061934 dated Jan. 17, 2019, 6 pages.
Written Opinion of International Application No. PCT/EP2018/061934 dated Jan. 17, 2019, 7 pages (English translation unavailable).
International Preliminary Report on Patentability (Form IPEA/409) of International Application No. PCT/EP2018/061934, dated Jan. 3, 2020, 24 pages (English translation unavailable).
International Search Report of International Application No. PCT/EP2018/061935, dated Jan. 18, 2019, 7 pages.
Written Opinion of International Application No. PCT/EP2018/061935, dated Jan. 18, 2019, 6 pages.
International Preliminary Report on Patentability (Form IPEA/409) of International Application No. PCT/EP2018/061935, dated Jul. 6, 2020, 20 pages.
First Office Action from related Chinese Patent Application No. 201880093277_X dated Nov. 26, 2021 (14 pages) including English translation.
Office Action from related Japanese Patent Application No. 2020-562609 dated Dec. 21, 2021 (11 pages) including English translation.
Bicycling Catalog 39—Giant Phase 2 Road Shoe [online] <https://www.camdenbikes.com/product/giant-phase-2-road-shoe-243911-1.htm> Accessed Date: Jul. 16, 2019 (3 pages).
Bicycling Catalog 39—Line MES composite sole off-road shoe [online]: <https://www.berkshirebikeandboard.com/product/giant-line-mes-composite-sole-off-road-shoe-341091-1.htm> Accessed Date: Jul. 16, 2019 (4 pages).
Hot pressing film TPU film for bonding synthetic leather and mesh fabric together on shoes upper [online] <https://www.alibaba.com/product-detail/hot-pressing-film-TPU-film-for_60164856956.html> Accessed Date: Jul. 16, 2019 (5 pages).

* cited by examiner

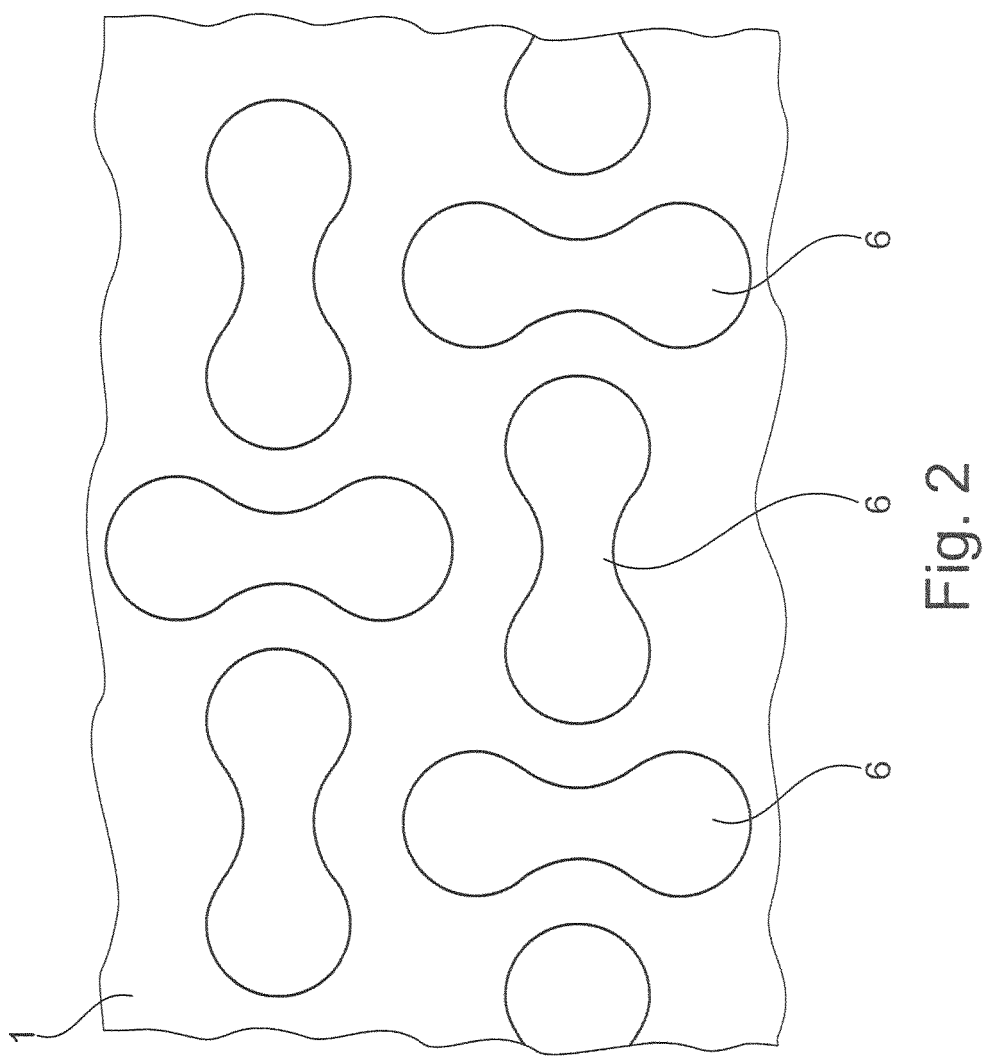

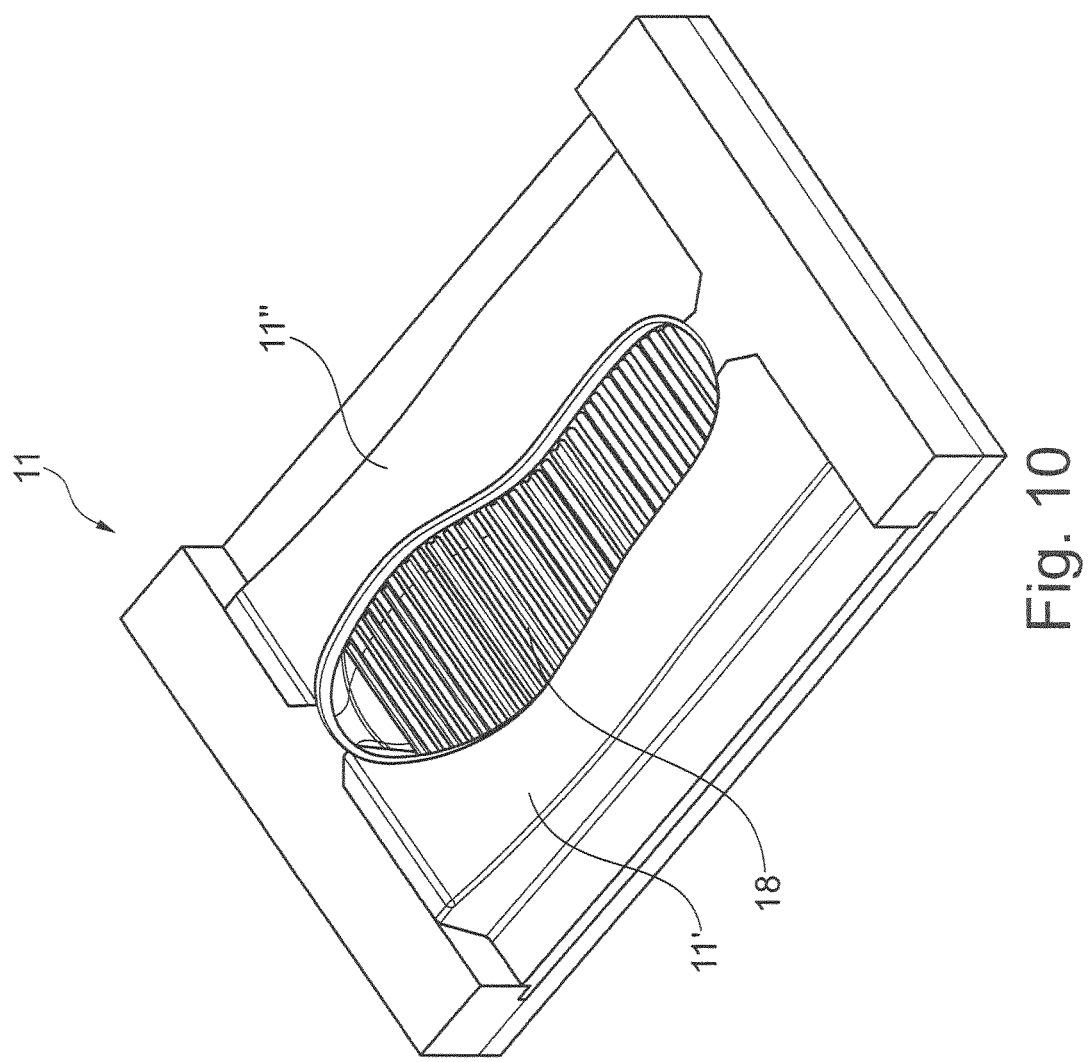

METHOD FOR PRODUCING A SOLE OF A SHOE, IN PARTICULAR OF A SPORTS SHOE

This application is a U.S. National Stage application, filed pursuant to 35 U.S.C. § 371, of international application no. PCT/EP2018/061935, filed on May 8, 2018, the contents of which is incorporated herein by reference in its entirety.

The invention relates to a method for producing a sole of a shoe, in particular of a sports shoe.

Especially for sports shoes, soles are sometimes required or desired which have a number of recesses which extend in a transverse direction perpendicular to the longitudinal direction as well as perpendicular to the vertical direction and at least partially penetrate the sole. This is an attempt to give the sole a certain and desired spring behaviour by the geometrical design of the sole. This means that the sole exhibits a desired deformation behaviour in the vertical direction when subjected to the weight of the wearer of the shoe, in particular a certain characteristic curve between the force applied and the strain in the vertical direction. Such a sole is known from U.S. Pat. No. 2,983,056 A, for example. The body of the sole is provided here in transverse direction with a plurality of recesses, which are formed circularly, laterally on the sole, thus seen in transverse direction. Such recesses can be used to influence the spring and damping behaviour of the sole.

The invention is based on the object of providing a method of the type mentioned above by which such soles can be manufactured with dimensional accuracy and process stability, especially with complex recesses.

The solution of this object by the invention is characterized by the fact that the method comprises the following steps:
a) Producing of a first sole part in a first mould or mould part by injecting, spraying or pouring the sole material (in injection-moldable, pourable or sprayable condition) into a mould cavity of the first mould or mould part, wherein a number of volume elements protrude into the mould cavity and create cavities in the first sole part;
b) Producing of a second sole part in a second mould or mould part by injecting, spraying or pouring the sole material (in injection-moldable, pourable or sprayable condition) into a mould cavity of the second mould or mould part, wherein a number of volume elements protrude into the mould cavity and create cavities in the second sole part;
c) After the first and second sole parts have solidified: Removing the first and second sole parts from the first and second mould or mould part and placing the first and second sole parts into a third mould;
d) Overpouring, overspraying and/or overinjecting a joining material over at least one section of the first and second sole parts, wherein the sections of the first and second sole part over which the material is overpoured, oversprayed and/or overinjected adjoining each other, in order to join the first and second sole parts to each other.

Accordingly, at least two parts, preferably two halves, of the sole are prefabricated in the said first or second mould, creating cavities in the sole which, during subsequent use of the shoe, extend in particular in a direction transverse to the longitudinal direction of the shoe and to the vertical direction (when the shoe is used as intended). These two prefabricated parts of the sole are then placed in a third mould and joined together by applying a bonding material.

In general, more than two parts can be used. In this case, it is accordingly provided that the method will further comprise the steps:
e) Producing of at least one further sole part in a further mould or mould part by injecting, spraying or pouring the sole material (in injection-moldable, pourable or sprayable condition) into a mould cavity of the further mould or mould part, wherein a number of volume elements protrude into the mould cavity and create cavities in the further sole part;
f) After the further sole part has solidified: Removing the further sole part from the further mould or mould part and inserting the further sole part together with the first and second sole part into the third mould;
g) Overpouring, overspraying and/or overinjecting a joining material over at least one section of the first, the second and the further sole part, wherein the sections of the first, the second and the further sole part over which the material is overpoured, oversprayed and/or overinjected adjoining each other, in order to join the first, the second and the further sole parts to each other.

In the third mould again volume elements can be arranged, which during the above steps d) or g) fill the cavities in the sole parts and thus keep them free.

During the production of the first and second sole part the mould cavities of the first and second mould or mould part can be closed off by a closure part. This results in a defined geometry for the part of the sole to be produced.

Before the sole parts are inserted into the third mould, a further sole element is preferably placed in the third mould. This further sole element is preferably an outer sole. Thereby, it is preferably provided that the joining material and the further sole element are arranged on opposite sides of the sole to be produced. Between the further sole element and the sole parts a binding agent can be introduced; this is in particular an adhesive with liquid polyurethane being the preferred choice.

Polyurethane material, thermoplastic polyurethane (TPU) or thermoplastic elastomer (TPE) or a material comprising these substances is preferably used as material for the sole parts and/or as joining material. The material for the sole parts and/or the joining material is thereby preferably foamed.

The material of the sole parts has preferably a density between 0.20 and 0.50 g/cm$^3$. It has preferably a hardness between 30 and 50 Asker C.

The mentioned sole parts form preferably a midsole.

The opening of the third mould for the purpose of demoulding the finished sole takes preferably place by moving two parts of the third mould away from each other.

The recesses in the finished sole preferably penetrate at least partially the sole completely in transverse direction. However, it can also be provided that the recesses only extend over part of the sole in the transverse direction.

The design of the sole achieved in this way makes it possible to influence the control of the spring and cushioning properties or the hardness of the sole in a simple way. By the design of the recesses it is possible to realize a desired spring deflection when the sole is loaded with the weight of the wearer of the shoe equipped with the sole.

Insofar, this concept is based on the use of so-called "Mechanical Meta Material", in which it is intended that various rows of openings (known here are round or oval recesses, especially in cross-section) of different sizes are or are to be inserted into the sole in order to achieve a certain spring or cushioning behaviour of the sole. This enables "Engineered Damping", in which the spring or damping properties obey a desired characteristic curve.

When a deformation force—caused by the weight of the wearer of the shoe—is applied, the resulting cells collapse in a special way so that special spring or damping characteristics can be realized.

In this respect, a "programmable folding or collapsing" of the sole structure is achieved, so to speak, since the structure itself forms a coherent system and the individual material sections are interdependent.

The advantages of the structure achieved by the proposed method can lead to a "negative stiffness", i.e. if the sole is slightly compressed in a vertical direction, the sole collapses in a defined way. It is also possible to structure the sole in the described way so that it has a sufficient degree of elasticity on the one hand and absorbs deformation energy due to a deformation force on the other.

The proposed method allows a process stable and precise production of the sole.

As explained above, the sole to be produced can consist of at least two, but also more sole parts.

The volume elements used are rod-shaped and have a constant cross-section along their longitudinal extension. This can ultimately have any shape. As shown in connection with the following embodiment, the cross-sectional shape of an "eight" is provided here, for example. The volume elements can be produced by means of an additive manufacturing process (3-D printing) or in another way, for example by a classical machining process (milling). Stainless steel in particular is a suitable material for the volume elements.

The volume elements can be arranged interchangeably in the first or second (and possibly also further) mould or mould part to produce soles with differently shaped cavities.

In the drawings an embodiment of the invention is shown.

Figure 5:
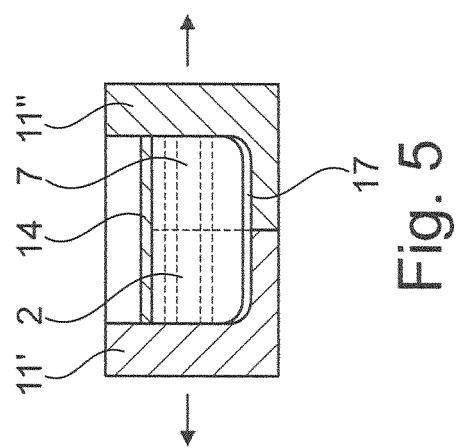
Figure 4:
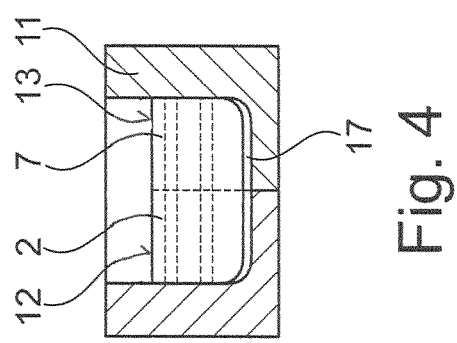
Figure 3:
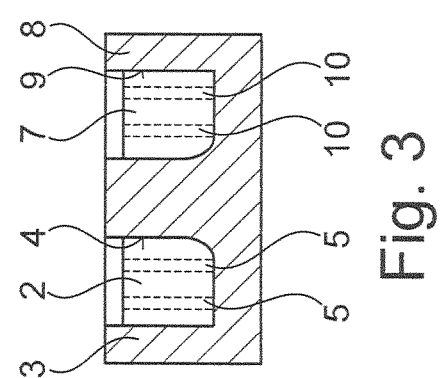
Figure 6:
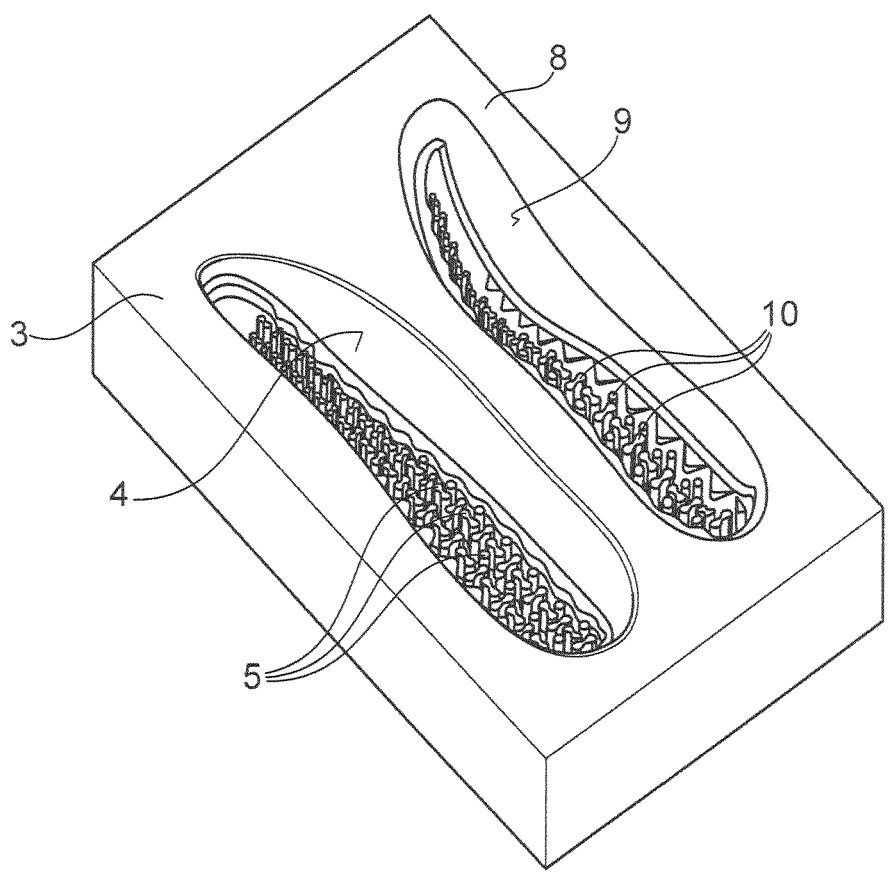
Figure 7:
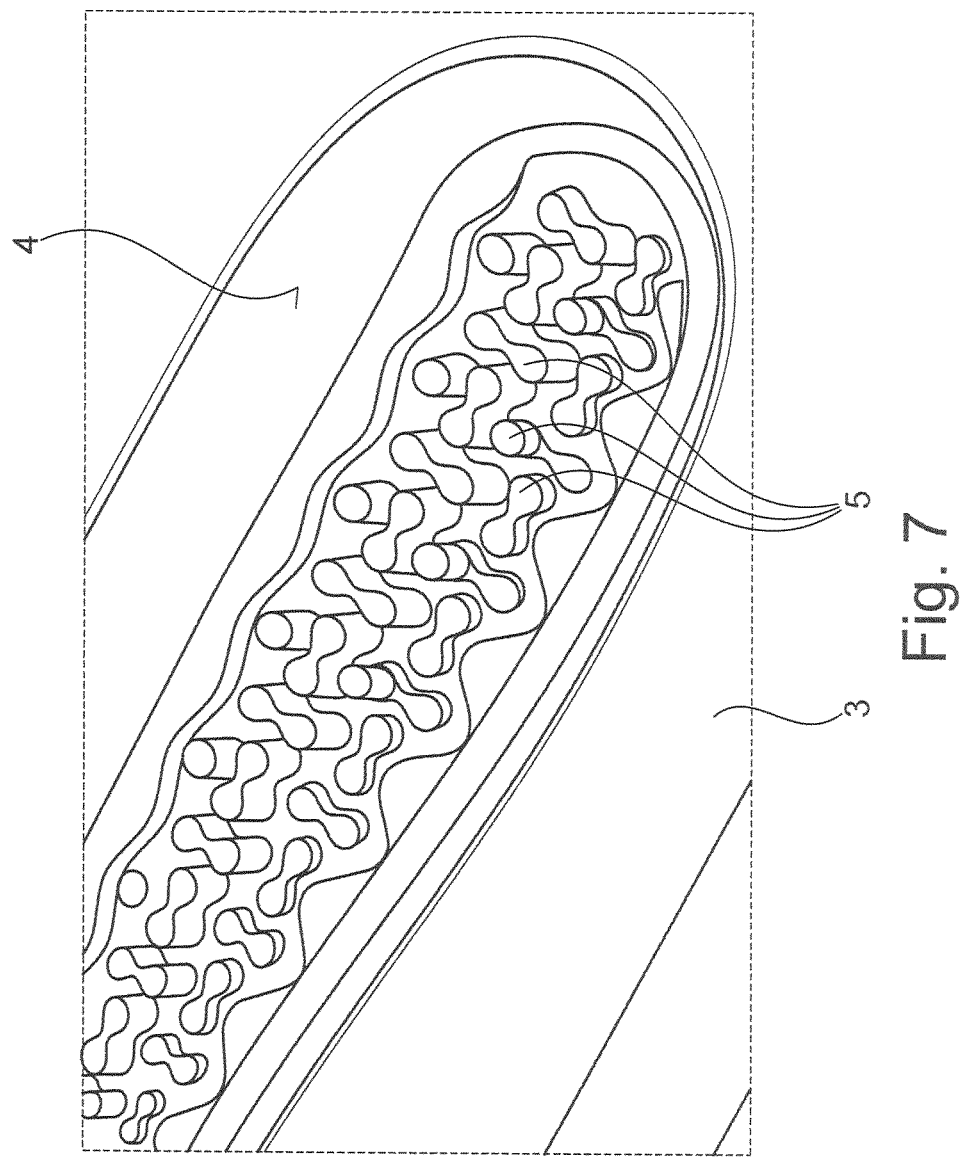
Figure 8:
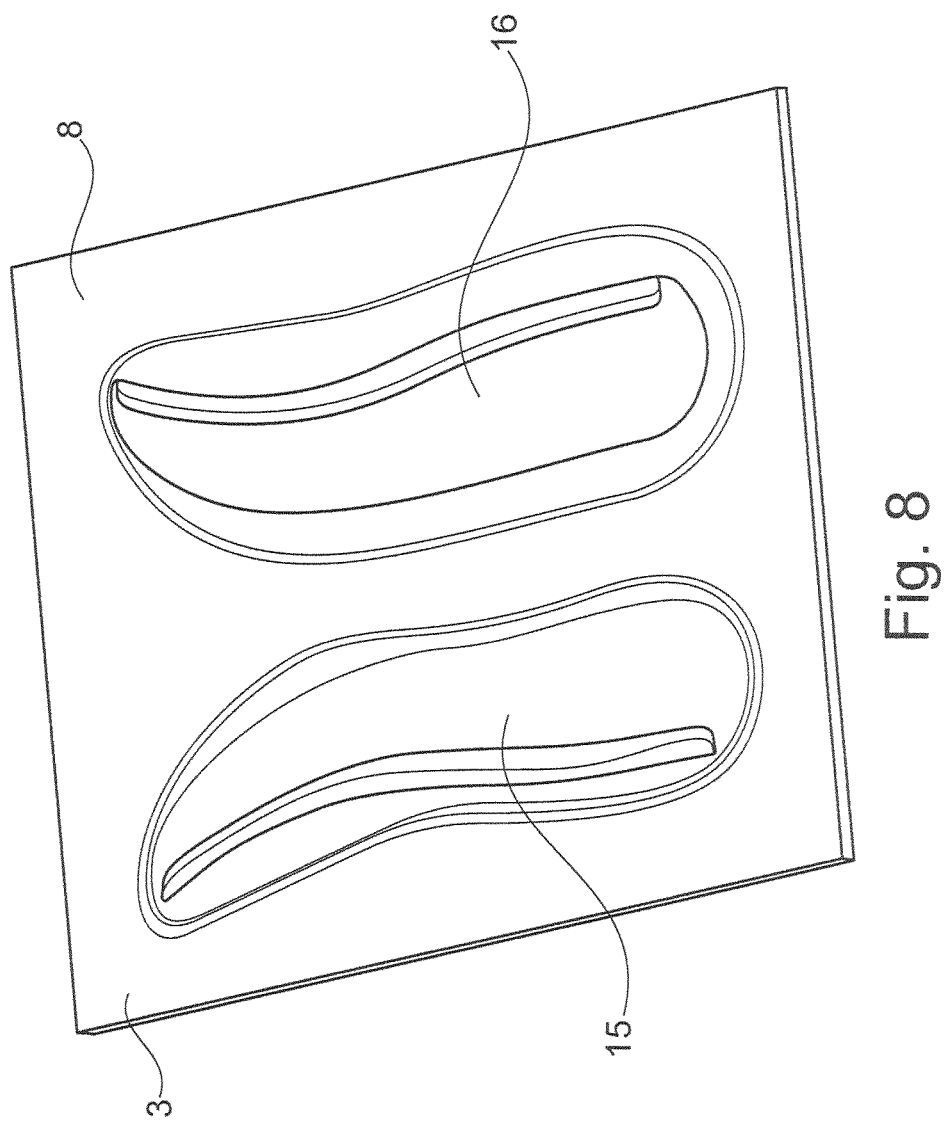
Figure 9:
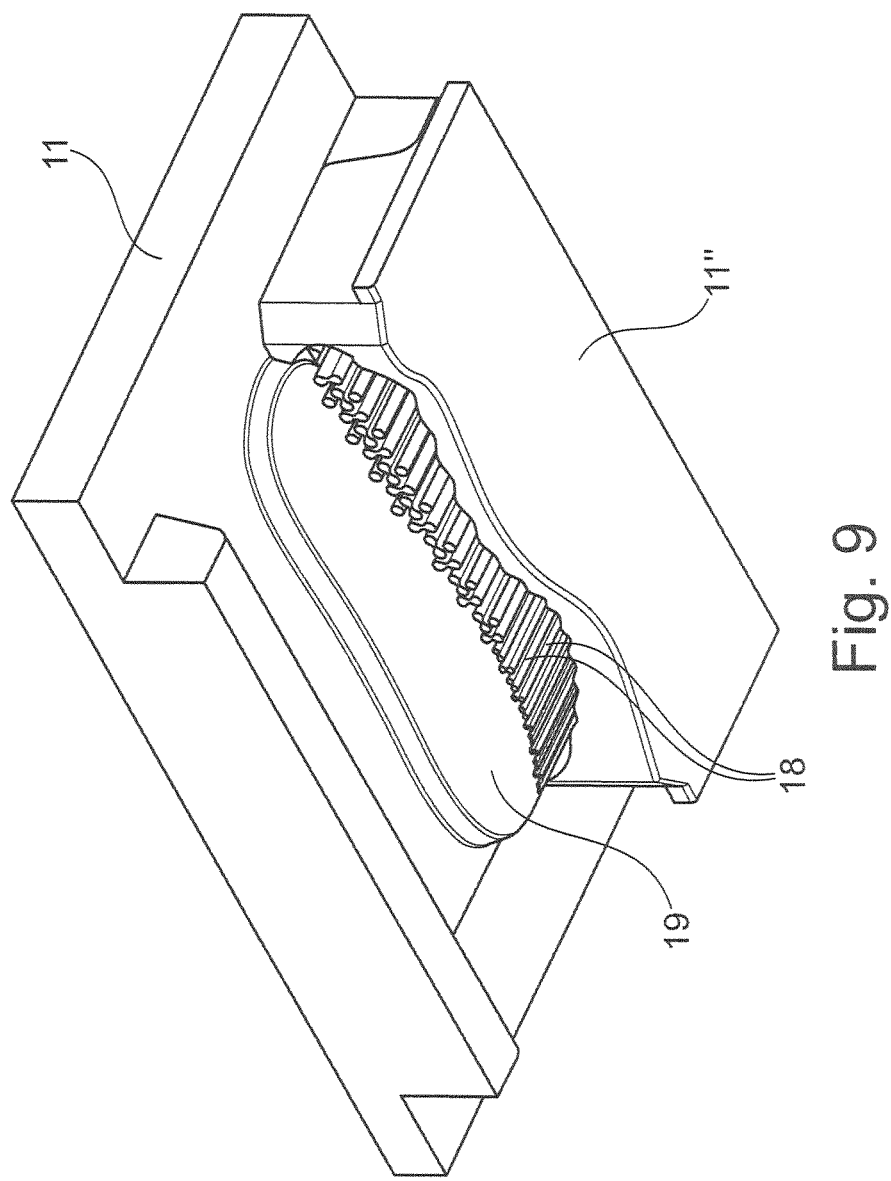

FIG. 1 shows a midsole of a sports shoe (still without upper applied connecting material), wherein this is produced according to the method according to the invention, FIG. 2 shows the section "X" according to FIG. 1 in more detail, seen in a transverse direction perpendicular to the longitudinal direction of the sole and perpendicular to the vertical direction, FIG. 3 shows schematically a first and a second mould part, in each of which one half of the midsole is produced, FIG. 4 shows schematically a third mould in which the two prefabricated halves of the midsole are inserted, whereby the connecting material connecting the two halves is still missing, FIG. 5 shows the third mould as shown in FIG. 4, where the connecting material connecting the two halves of the midsole has now been inserted, FIG. 6 shows in perspective view the first and second still empty mould part, FIG. 7 shows a section of FIG. 6 in enlarged view, FIG. 8 shows in perspective view, the first and second mould parts, with closure elements arranged in each case to delimit their cavities, FIG. 9 shows in perspective view the partially depicted third empty mould and FIG. 10 shows in perspective view the third empty mould, where an upper closure part of the cavity is missing.

FIG. 1 shows a sole 1, which extends in a longitudinal direction L (corresponding to the longitudinal axis of the shoe with the sole) and in a vertical direction V (the vertical direction V indicates the direction when the shoe or the sole is standing on the ground when used as intended).

Furthermore, sole 1 extends in a transverse direction Q, which is perpendicular to both the longitudinal direction L and the vertical direction V.

Sole 1 is here designed as a midsole, to the upper side of which the (not shown) shoe upper is attached in known manner. An outer sole (not yet shown in FIG. 1) is attached to the bottom side of the sole.

Cavities 6 (recesses) are incorporated into the sole 1. Preferably, these recesses extend in transverse direction Q over the entire width of the sole 1. Details of the design and arrangement of the cavities 6 are shown in FIG. 2. FIG. 2 shows the detail "X" according to FIG. 1, namely the geometrical design of a possible embodiment of the cavities 6.

As can be seen in FIG. 2 in combination with FIG. 1, two rows of cavities 6 are inserted into the sole 1, each of which has the shape of an "eight" in the preferred embodiment shown here. This design enables the sole of the shoe to exhibit a special spring or cushioning behavior, whereby the sole collapses in a predetermined manner due to the recesses, especially when subjected to the weight of the wearer of the shoe, which provides a pleasant feeling of wear.

As can be seen in FIG. 1, the sole 1 consists of two parts, namely a first part 2 and a second part 7, with sections 12 and 13 respectively on the upper side of each sole part 2 and 7, which are arranged adjacent to each other and form a largely flat surface (which essentially forms the later supporting surface for the wearer's foot). The two sole parts 2 and 7 are produced separately, each with the desired cavities 6, and then joined by applying bonding material to the sections 12 and 13, which holds the two sole parts 2, 7 together.

The provided process engineering method for this is illustrated in the following FIGS. 3 to 10.

FIG. 3 shows at first schematically a first method step, in which a first sole element 2 and a second sole element 7 are produced in a mould that has a first mould part 3 and a second mould part 8. The two mould parts 3 and 8 are here, which is not mandatory, arranged in a common tool body.

Each of the two sole parts 2 and 7 represents a half of the midsole of a shoe to be produced. In this respect, reference is made to FIG. 1, where the two parts are shown. To produce the two sole parts 2 and 7, liquid plastic material is injected, poured or sprayed into the first mould cavity 4 of the first mould part 3 and into the second mould cavity 9 of the second mould part 8. Volume elements 5 and 10, respectively, are arranged in the mould cavities 4, 9 and extend from the wall of the mould cavities 4, 9. If liquid plastic material is injected into the mould cavities 4, 9, the volume elements 5 and 10 respectively spare volumes which can be found as cavities 6 in the sole parts 2 and 7 to be produced (see the dotted lines in FIG. 3).

When the sole parts 2 and 7 thus produced have solidified, they are removed from the two mould parts 3 and 8 and inserted into a third mould 11 as shown in FIG. 4. The two sole parts 2 and 7 are aligned with each other in such a way that the cavities 6 are at least partially aligned with each other and extend over the entire width of the sole to be produced; this is again indicated by the dotted lines in FIG. 4.

Before the two sole parts 2 and 7 are placed in the third mould 11, a further sole element 17 in the form of an outer sole is inserted in the lower area. A suitable adhesive can be placed between this sole element and the two sole parts 2 and 7 to ensure a firm connection between sole parts 2 and 7 and the other sole part 17.

Now—as illustrated in FIG. 5—joining material 14 is injected, sprayed or poured onto sections 12 and 13, so that a layer of material is formed on the two sole parts 2 and 7, which holds the two sole parts 2 and 7 together.

The third mould 11 consists of two parts 11' and 11", which are moved away from each other in the direction of the two arrows in FIG. 5 after the joining material 14 has hardened, so that the sole, thus finished, can be removed from mould 11.

FIGS. 3 to 5 show a very schematic representation. In contrast, the other FIGS. 6 to 10 show a more concrete version of the moulds used.

FIG. 6 shows again the mould with the first and second mould parts 3 and 8, respectively, and the mould cavities 4 and 9. It can further be seen how the volume elements 5 and 10 extend out of the wall of the respective cavities. This can be seen again in FIG. 7 in an enlarged view. In particular, the design of the volume elements in the shape of an "eight" can be seen, in order to create correspondingly formed cavities 6 (see FIG. 2) in the sole.

FIG. 8 shows how, during production of the two sole parts 2 and 7, the two mould parts 3 and 8 are closed by respective closure parts 15 and 16 in order to give the sole parts 2 and 7 to be produced a defined geometry.

FIGS. 9 and 10 show the third mould 11 or parts of it.

FIG. 9 shows one part 11' of the third mould 11 and a closure part 19 which closes the mould cavity of the third mould 11 at the top. Volume elements 18, corresponding to those shown in FIGS. 6 and 7, can also be seen. These are volume elements that engage in the prefabricated cavities 6 of the two sole parts 2 and 7 and keep them free during processing in the third mould 11 so that they are not closed by the process steps taking place in the third mould 11. It is easy to demould the finished sole if the two parts 11' and 11" of the third mould 11 move away from each other in the manner shown in FIG. 5.

FIG. 10 shows the two parts 11' and 11" of the third mould 11 pushed together, whereby the two sole parts 2 and 7 are not yet included in the third mould 11. However, the volume elements 18 can be seen here again, which, when pushed together as shown in FIG. 10, form volumes that extend across the entire width of the sole to be produced and thus keep the cavities 6 in the sole parts 2, 7 free.

REFERENCE NUMERALS

1 Sole
2 First sole part
3 First mould/first mould part
4 First mould cavity
5 Volume element
6 Cavity
7 Second sole part
8 Second mould/second mould part
9 Second mould cavity
10 Volume element
11 Third mould
11' Part of the third mould
11" Part of the third mould
12 Section of the first sole part
13 Section of the second sole part
14 Joining material
15 Closure part
16 Closure part
17 Further sole element (outer sole)
18 Volume element
19 Closure part L Longitudinal direction
V Vertical direction
Q Transversal direction

We claim:

1. A method of producing a sole of a shoe, wherein the sole comprises a first sole part and a second sole part, wherein the first and second sole parts adjoin each other on a surface extending in a longitudinal direction (L) of the shoe and in a vertical direction (V), and wherein the first and second sole parts have sections on upper sides thereof which are arranged adjacent to each other and together form a flat surface, comprising the steps of:

producing the first sole part in a first mould or mould part by injecting, spraying, or pouring the sole material into a first mould cavity of the first mould or mould part, wherein a number of volume elements protrude into the first mould cavity and create cavities in the first sole part;

producing the second sole part in a second mould or mould part by injecting, spraying, or pouring the sole material into a second mould cavity of the second mould or mould part, wherein a number of the volume elements protrude into the second mould cavity and create cavities in the second sole part;

removing the first and second sole parts from the first and second mould or mould part after the first and second sole parts have solidified, and placing the first and second sole parts into a third mould, wherein the two sole parts are aligned with each other in such a way that the cavities are at least partially aligned with each other and extend over the entire width of the sole to be produced;

overpouring, overspraying, or overinjecting a joining material over at least one section of the first and second sole parts, wherein the sections of the first and second sole part over which the material is overpoured, oversprayed or overinjected adjoining each other, in order to join the first and second sole parts to each other.

2. The method of claim 1, further the steps of:

producing a further sole part in a further mould or mould part by injecting, spraying, or pouring the sole material into a mould cavity of the further mould or mould part, wherein a number of the volume elements protrude into the further mould cavity and create cavities in the further sole part;

removing the further-sole part from the further mould or mould part after the third sole part has solidified and inserting the further-sole part together with the first and second sole parts into the third mould;

overpouring, overspraying, or overinjecting the joining material over at least one section of the first, the second, and the further sole parts, wherein the sections of the first, the second, and the further-sole parts over which the material is overpoured, oversprayed, or overinjected adjoining each other, in order to join the first, the second, and the further sole parts to each other.

3. The method of claim 1, wherein volume elements are arranged in the third mould, which fill the cavities in the first and second sole parts.

4. The method of claim 1, wherein during the production of the first and second sole parts the mould cavities of the first and second moulds or mould parts are closed off by a closure part.

5. The method of claim 1, wherein a further sole element is placed into the third mould before the first and second sole parts are inserted into the third mould.

6. The method of claim 5, wherein the further sole element is an outer sole.

7. The method of claim 5, wherein the joining material and the further sole element are arranged on opposite sides of the sole to be produced.

8. The method of claim 5, wherein a binding agent is introduced between the further sole element and the sole parts.

9. The method of claim 8, wherein the binding agent is liquid polyurethane.

10. The method of claim 1, wherein polyurethane material, thermoplastic polyurethane (TPU), or thermoplastic elastomer (TPE) is used as material for the sole parts or as joining material.

11. The method of claim 10, wherein the material for the sole parts or the joining material is foamed.

12. The method of claim 1, wherein the material of the first and second sole parts has a density of between 0.20 and 0.50 g/cm$^3$.

13. The method of claim 1, wherein the material of the first and second sole parts has a hardness of between 30 and 50 Asker C.

14. The method of claim 1, wherein the sole parts form a midsole.

15. The method of claim 1, wherein opening of the third mould for the purpose of demoulding the finished sole takes place by moving two parts of the third mould away from each other.

16. A method of producing a sole of a shoe, comprising the steps:

producing a first sole part in a first mould by providing a material into a first mould cavity of the first mould, wherein a plurality of volume elements protrude into the first mould cavity and create cavities in the first sole part;

producing a second sole part in a second mould by providing the material into a second mould cavity of the second mould, wherein a plurality of volume elements protrude into the second mould cavity and create cavities in the second sole part;

removing the first and second sole parts from the first and second moulds, and placing the first and second sole parts into a third mould, wherein the first and second sole parts are aligned with each other such that the cavities are aligned with each other and extend over an entire width of the sole; and providing a joining material over at least a portion of the first and second sole parts, wherein volume elements are arranged in the third mould, which fill the cavities in the first and second sole parts.

17. The method of claim 16, wherein the material of the first and second sole parts has a density of between 0.20 and 0.50 g/cm$^3$.

18. The method of claim 16, wherein a further sole element is placed into the third mould before the first and second sole parts are inserted into the third mould.

19. The method of claim 18, wherein the further sole element is an outer sole, and wherein a binding agent is provided between the further sole element and the sole parts.

* * * * *